(12) United States Patent
Kelly et al.

(10) Patent No.: US 6,297,474 B1
(45) Date of Patent: Oct. 2, 2001

(54) HEATING APPARATUS FOR A WELDING OPERATION AND METHOD THEREFOR

(75) Inventors: Thomas J. Kelly; Keith B. Alexander, both of Cincinnati, OH (US); Rabon Hensley, Erlanger, KY (US); Robert D. Lawrence, Hamersville; John H. Snyder, Fairfield, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/472,117

(22) Filed: Dec. 23, 1999

(51) Int. Cl.[7] .................................................... B23K 9/16
(52) U.S. Cl. ............................... 219/137 WM; 219/75; 228/232
(58) Field of Search ................................. 219/137 WM, 219/137 R, 72, 74, 75; 228/230, 232, 262.71

(56) References Cited

U.S. PATENT DOCUMENTS

| | | | |
|---|---|---|---|
| 5,897,801 | 4/1999 | Smashey et al. | 219/137 |
| 6,054,672 | 4/2000 | Foster et al. | 219/121.66 |

*Primary Examiner*—Clifford C. Shaw
(74) *Attorney, Agent, or Firm*—Andrew C. Hess; Gerry S. Gressel

(57) ABSTRACT

A heating apparatus and method for pre-weld heat treating, welding and post-weld heat treating a superalloy article in a single enclosure while avoiding oxidation of the article. The enclosure is preferably equipped with a one-way valve that permits the escape of gases, but otherwise seals the enclosure to prevent the ingress of air during welding and heat treatment as a result of thermal gradients induced when the article is inductively heated. To provide access to the article and a device used to weld the article, the enclosure is equipped with gloves by which the welding device and the article can be manipulated while a nonreactive atmosphere is fully maintained within the enclosure and the article is inductively heating.

14 Claims, 1 Drawing Sheet

HEATING APPARATUS FOR A WELDING OPERATION AND METHOD THEREFOR

FIELD OF THE INVENTION

This invention relates to welding apparatuses and methods. More particularly, this invention is directed to an apparatus configured to perform both a welding operation and pre-weld and post-weld heat treatments on a superalloy component while preventing oxidation of the component.

BACKGROUND OF THE INVENTION

High temperature cobalt and nickel-based superalloys are widely used to form certain components of gas turbine engines, including combustors and turbine vanes and blades. While high-temperature superalloy components are often formed by casting, circumstances exist where superalloy components are preferably or are required to be fabricated by welding. For example, components having complex configurations, such as turbine midframes and shroud support rings, can be more readily fabricated by welding separate castings together. Because the cost of components formed from high-temperature cobalt and nickel-based superalloys is relatively high, restoring and repairing these components is typically more desirable than replacing them when they become worn or damaged. As a result, welding is also widely used as a method for restoring blade tips, and for repairing cracks and other surface discontinuities in superalloy components caused by thermal cycling or foreign object impact. To improve yields, superalloy components are often welded while maintained at an elevated temperature, e.g., in excess of about 1500° F. (about 815° C.).

Superalloy components of gas turbine engines must generally be thermally stress-relieved before welding to relax residual stresses present from engine service, and then stress-relieved after welding to relax residual stresses induced during cool down from the welding operation. Heat treatment also provides stress relief by dissolution of a portion of hardening gamma prime (γ') in γ'-strengthened nickel-base superalloys. Generally, the heat treatment parameters will vary depending on the alloy of interest, the amount of residual stress relief and dissolution required, furnace design, component geometry and many other factors. The ramping rates, soak temperatures, hold times and cooling rates for stress relief and dissolution heat treatments are critical in order to obtain the desired stress relief without adversely affecting the superalloy and its properties.

In the past, pre-weld and post-weld heat treatments have been performed in large batch heat treatment furnaces to ramp and hold a group of components at a suitable heat treatment temperature. Drawbacks to the use of batch heat treatment processes include long heat treatment times due in part to the mass of the large batch furnace and the mass of the typically large number of components being heat treated. Additionally, long queuing times occur while batches are assembled as individual components are repaired. Therefore, use of batch furnace pre-weld and post-weld stress relief heat treatments represent a time delay to the flow of components through a welding line, and is an inefficient method to metallurgically condition components for welding.

While overcoming the prior art requirement for batch heat treatments, use of the apparatus taught by Broderick et al. has encountered difficulties associated with oxidation of the component being welded. While sealed along its four side walls and base, the enclosure taught by Broderick et al. is required to be open at its top in order to gain access to and weld the component within. Though Broderick et al. flow an inert gas up through the enclosure, and employ an overhead exhaust hood for drawing away the inert gas and flumes generated during the welding operation, oxidation of superalloy components has nonetheless occurred. Accordingly, further improvements to the apparatus taught by Broderick et al. are necessary to improve weld quality and yields, in addition to achieving improved processing efficiency for manufacturing, restoring and repairing superalloy components by welding.

As a solution to the above, U.S. Pat. No. 6,124,568 to Broderick et al. teach an apparatus and method for heat treating and welding superalloy components. More particularly, the apparatus enables pre-weld and post-weld heat treatments to be performed on a component within the same enclosure in which the welding operation is performed. The enclosure is used in conjunction with a memory storage device that stores appropriate pre-weld and post-weld heat treatment temperature profiles and a welding temperature profile for the component. The apparatus further includes a control by which the output of the device used to heat the component is adjusted based on the component temperature and according to the preestablished pre-weld and post-weld heat treatment temperature and the welding temperature profiles.

BRIEF SUMMARY OF THE INVENTION

The present invention generally provides a heating apparatus and method for pre-weld heat treating, welding and post-weld heat treating a superalloy article in a single enclosure while avoiding oxidation of the article. In contrast to Broderick et al., the present invention employs an enclosure that prevents the ingress of air into the enclosure during welding and heat treatment.

According to this invention, oxidation of a superalloy article can occur with the apparatus of Broderick et al. as a result of Broderick et al. using an open-top enclosure, which was believe to be necessary to allow an operator to perform the welding operation on an article within the enclosure. However, intense heating of a superalloy article by induction is believed to create sufficient thermal gradients immediately around the heated portion of the article, that the resulting turbulence draws air downwardly into the enclosure through the opening in the enclosure, even though inert gas is continuously flowed upward through the enclosure and out through the top into an overhead exhaust hood. The enclosure of this invention is equipped with a valve that permits gases within the enclosure to escape, but is otherwise sealed to prevent air from being drawn into the enclosure. To provide access to the article and the device used to weld the article, the present invention provides gloves attached to the enclosure by which the welding device and the article can be manipulated while a nonreactive atmosphere is fully maintained within the enclosure and the article is inductively heating. As a result, in addition to eliminating the processing drawbacks known for batch-type pre-weld and post-weld heat treatments of superalloy articles fabricated, restored or repaired by welding, the present invention also prevents the oxidation of such articles while at the high temperatures required for welding and heat treatment.

Other objects and advantages of this invention will be better appreciated from the following detailed description.

DETAILED DESCRIPTION OF THE INVENTION

Figure 1:
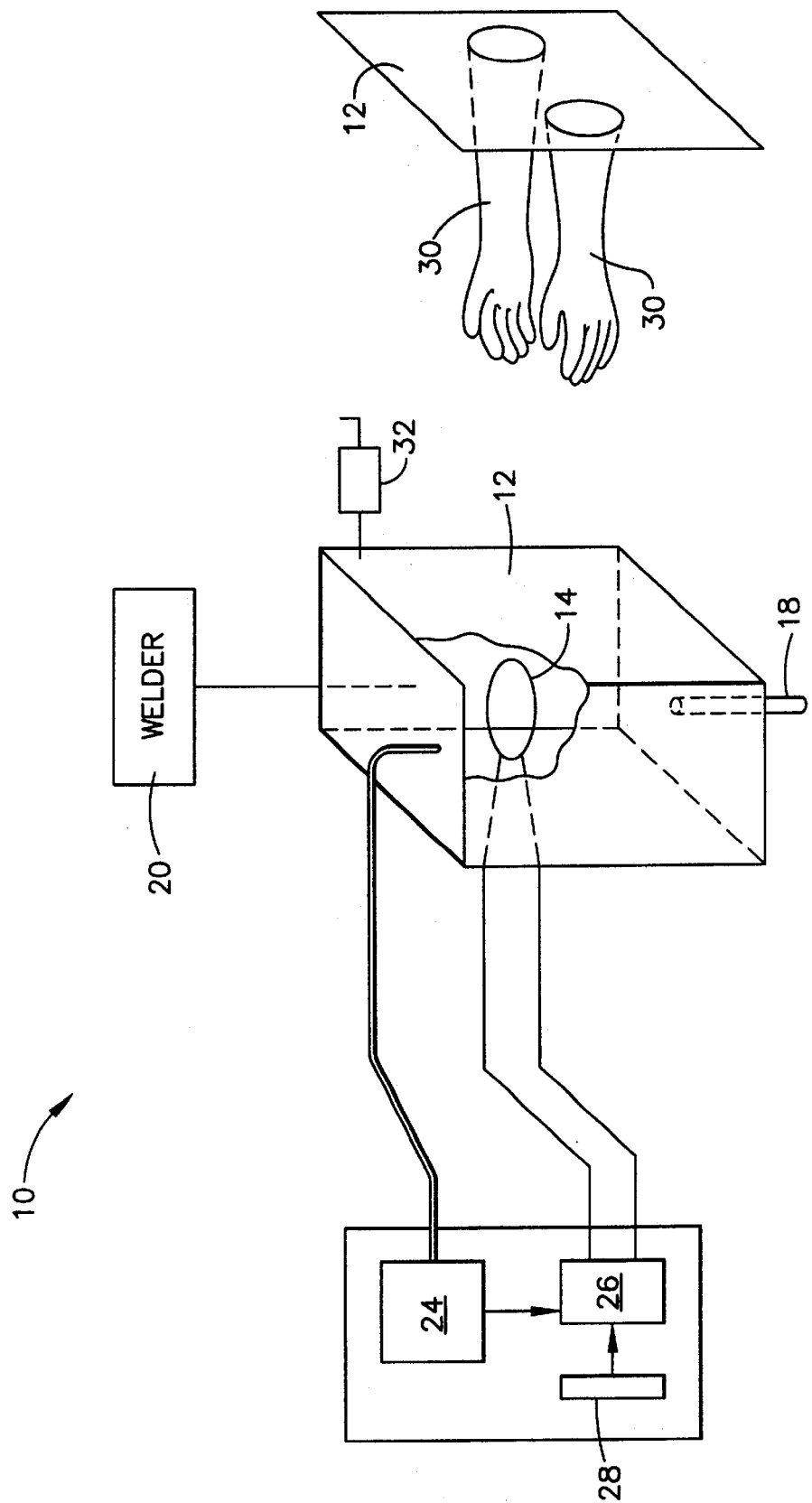
FIG. 1 is a schematic representation of a combination heat treatment and welding apparatus in accordance with this invention.

The present invention is generally directed to superalloy articles that undergo a welding operation during their fabrication, restoration or repair. While the advantages of this invention will be described with reference to components of gas turbine engines, the invention is also applicable to a variety of applications in which an article is to be heat treated before and after welding in a manner that will not degrade the properties of the article.

An apparatus 10 for performing the heat treatments and welding operation of this invention is schematically depicted in FIG. 1. The apparatus 10 includes an enclosure 12 specially adapted for performing a welding operation such as tungsten inert gas (TIG) or plasma transferred arc (PTA) welding in a controlled atmosphere. The apparatus 10 is also shown to include an induction heating coil 14 of a type known in the art. The coil 14 is preferably sized and shaped to closely surround a very localized region of an article being welded so that uniform and rapid heating of the localized region occur. The enclosure 12 also includes an inlet 18 through which an inert gas (such as argon) is fed from below to the interior of the enclosure 12, so that an inert atmosphere envelopes the article while at the elevated processing temperatures of this invention. A one-way flow control valve 32 is shown attached to one wall of the enclosure 12, through which the inert gas and fumes can be exhausted from the enclosure 12 while preventing air from being drawn into the enclosure 12. Finally, the apparatus 10 is shown to include a welder 20. The welder 20 is preferably a TIG or PTA welder, though it is foreseeable that other welding systems could be used. The filler material may be in the form of a superalloy wire whose composition is metallurgically compatible with that of the article and appropriate for the operating environment of the article. Notably absent from the apparatus 10 is an access opening to the interior of the enclosure 12, and an exhaust hood for removing fumes generated during the welding operation.

According to the invention, the apparatus 10 further includes a pair of gloves 30 attached to one of the walls of the enclosure 12 so that the article being welded and/or the welder 20 can be manipulated within the enclosure 12. The gloves 30 eliminate the prior requirement for an opening in the enclosure 12 to permit access to the welder 20 and the article being welded. As a result, with the exception of the one-way valve 32, the enclosure 12 remains sealed while the article is at an elevated temperature to prevent air surrounding the enclosure 12 from being drawn into the enclosure 12 due to severe thermal gradients or other potential causes.

The apparatus 10 of this invention is preferably employed to perform pre-weld and post-weld heat treatments on superalloy articles welded within the enclosure 12. Before welding, an article first undergoes heat treatment within the enclosure 12 to relax residual stresses present as a result of the severe service of the article and, if the article is formed of a γ'-strengthened nickel-base superalloy, to provide alloy softening by dissolution of a portion of the hardening γ' phase. Following welding, the article undergoes a second heat treatment within the enclosure 12 to relax any residual stresses induced during the welding operation. In accordance with Broderick et al., the welding apparatus 10 of this invention preferably enables control of the temperature and time profile within the enclosure 12 in a manner that facilitates pre-weld and post-weld stress relief heat treatments and welding within the enclosure 12 using a single variable-temperature thermal exposure, instead of separate batch and welding furnaces as required in the past. The preferred process carried out in the welding apparatus 10 preferably does not involve cooling the article between temperature cycles, but instead cools the article directly from a pre-weld temperature profile to a lower-temperature welding profile, and then reheats the article directly from the welding profile to a post-weld temperature profile, as described in Broderick et al., which is incorporated herein by reference. The pre-weld and post-weld profiles preferably do not include constant-temperature soaks. The result is not only a reduced cycle time by eliminating cool downs to room temperature, but also shorter heat treatment cycles before and after welding. However, it is foreseeable that pre-weld and post-weld treatments performed with the apparatus 10 of this invention could include soaks.

The above operational capabilities require the ability to detect the temperature of the article within the enclosure 12 with suitable temperature sensing equipment 24, preferably multiple optical pyrometers, though it is foreseeable that one or more standard-type K thermocouples could be used. The temperature signal from the sensing equipment 24 is used as input to a programmable temperature controller 26, which compares the signal from the equipment 24 to the desired pre-weld, weld and post-weld profiles stored in memory 28 for the article. The control signal to the induction coil 14 is then regulated based on the difference between the desired temperature profile and the temperature of the article. In this manner, essentially any temperature profile required for a given superalloy article can be programmed and accurately controlled to achieve the objects of this invention. The use of two or more pyrometers is preferred by this invention to monitor the uniformity of the article temperature and to prevent cycling of the induction coil 14 if one of the pyrometers senses a false temperature for the article, as would happen if the weld arc crosses the optical path of a pyrometer. For this reason, the controller 26 is preferably programmed to ignore a temperature spike reported by a pyrometer.

In view of the above, it can be seen that the present invention enables a superalloy article to be heat treated and welded within a single sealed enclosure 12 that prevents the article from being oxidized while at elevated heat treatment and welding temperatures. Accordingly, the invention achieves a more reliable process for performing three discrete high-temperature operations in a single thermal cycle. While discussed in terms of processing superalloy articles, the apparatus 10 of this invention could also be employed for the treatment and welding of other materials and articles whose processing requires accurate control at elevated temperatures to avoid degradation of the article properties. Therefore, while the invention has been described in terms of a preferred embodiment, it is apparent that other forms could be adopted by one skilled in the art. Accordingly, the scope of the invention is to be limited only by the following claims.

What is claimed is:

1. A method of welding a superalloy article, the method comprising the steps of:

establishing a pre-weld heat treatment temperature profile, a welding temperature profile, and a post-weld heat treatment temperature profile for a superalloy article;

placing the superalloy article in an enclosure with walls that enclose the article on all sides, the enclosure having associated therewith one-way flow means for venting gases from the enclosure, means for inductively heating the article, means for sensing a temperature of the article, and means for controlling the induction heating means based on the temperature of the article and according to the pre-weld heat treatment temperature profile, the welding temperature profile, and the post-weld heat treatment temperature profile;

establishing a nonreactive atmosphere in the enclosure by sealing the enclosure with the exception of the one-way flow means and then flowing an inert gas into the enclosure, the one-way flow means allowing venting of the inert gas from the enclosure while preventing air from entering the enclosure;

operating the induction heating means, the sensing means and the controlling means to heat the article according to the pre-weld heat treatment temperature profile;

without removing the article from the enclosure, operating the induction heating means, the sensing means and the controlling means to heat the article directly from the pre-weld heat treatment temperature profile to the welding temperature profile;

welding the article while maintaining the temperature of the article according to the welding temperature profile, the welding step being performed with a welding device manipulated with gloves attached to one of the walls of the enclosure, the enclosure and the one-way flow means preventing air from being drawn into the enclosure by thermal gradients induced when the article is inductively heated while the one-way flow means allows venting of the inert gas and welding fumes from the enclosure; and then without removing the article from the enclosure, operating the induction heating means, the sensing means and the controlling means to heat the article directly from the welding temperature profile to the post-weld heat treatment temperature profile.

2. A method according to claim 1, wherein the welding temperature profile consists of temperatures below the pre-weld heat treatment temperature profile.

3. A method according to claim 1, wherein the welding temperature profile consists of temperatures below the post-weld heat treatment temperature profile.

4. A method according to claim 1, wherein the welding temperature profile consists of temperatures below the pre-weld and post-weld heat treatment temperature profiles.

5. A method according to claim 1, wherein the pre-weld and post-weld heat treatment temperature profiles are characterized by the absence of a constant temperature soak.

6. A method according to claim 1, wherein the temperature of the article is sensed with multiple optical pyrometers.

7. A method according to claim 1, wherein the induction heating means comprises induction coils surrounding the article.

8. A method according to claim 1, wherein the welding device is selected from the group consisting of tungsten inert gas and plasma transferred arc.

9. A method according to claim 1, wherein the article is a component of a gas turbine engine.

10. A welding apparatus comprising:

an enclosure adapted for containing a superalloy article, the enclosure having walls for enclosing the article on all sides and a one-way flow means that prevent air from being drawn into the enclosure by thermal gradients induced when the article is inductively heated while allowing venting of gases from the enclosure;

induction heating means within the enclosure for heating the article;

means for sensing a temperature of the article while within the enclosure;

memory means for storing a pre-weld heat treatment temperature profile, a welding temperature profile, and a post-weld heat treatment temperature profile of the article;

means for controlling the induction heating means based on the temperature of the article according to the pre-weld heat treatment temperature profile, the welding temperature profile, and the post-weld heat treatment temperature profile;

means for welding the article while the article is within the enclosure and at a temperature of the welding temperature profile; and glove means attached to the enclosure for manipulating the welding means and the article within the enclosure.

11. A welding apparatus according to claim 10, wherein the welding temperature profile consists of temperatures below the pre-weld heat treatment temperature profile.

12. A welding apparatus according to claim 10, wherein the welding temperature profile consists of temperatures below the post-weld heat treatment temperature profile.

13. A welding apparatus according to claim 10, wherein the induction heating means comprises induction coils surrounding the article.

14. A welding apparatus according to claim 10, wherein the welding means is selected from the group consisting of tungsten inert gas and plasma transferred arc.

* * * * *